United States Patent [19]

Hall

[11] 4,003,753

[45] Jan. 18, 1977

[54] ELECTRODE STRUCTURE FOR ELECTRICAL ENERGY STORAGE DEVICE

[75] Inventor: John C. Hall, Granada Hills, Calif.

[73] Assignee: Rockwell International Corporation, El Segundo, Calif.

[22] Filed: Mar. 15, 1976

[21] Appl. No.: 667,001

[52] U.S. Cl. .............................. 429/199; 429/218
[51] Int. Cl.² ........................................ H01M 43/00
[58] Field of Search ............ 136/6 R, 6 LF, 6 FS, 136/20, 83 R, 83 T, 100 R

[56] References Cited

UNITED STATES PATENTS

| | | | |
|---|---|---|---|
| 3,647,542 | 3/1972 | Berger | 136/6 FS |
| 3,925,098 | 12/1975 | Saunders et al. | 136/6 LF |
| 3,933,520 | 1/1976 | Gay et al. | 136/6 LF |

Primary Examiner—Anthony Skapars
Attorney, Agent, or Firm—L. Lee Humphries; Henry Kolin; Clark E. DeLarvin

[57] ABSTRACT

A rechargeable electric energy storage device including a negative electrode, a positive electrode and an electrolyte, at least one electrode including a plurality of wall members, forming a plurality of cells having a certain open cross-sectional area, a substantially planar electrolyte-permeable member affixed to the wall members and covering the open end of the cells, and a body of electrochemically active material in said cells; the active material being a solid at the operating temperature of the device and retained in the cells of the wall members by the electrolyte-permeable member.

11 Claims, 7 Drawing Figures

ELECTRODE STRUCTURE FOR ELECTRICAL ENERGY STORAGE DEVICE

BACKGROUND OF THE INVENTION

1. Field of the Invention

This invention relates to an improved high-temperature electrically regenerable electrochemical system. It more particularly relates to an alkali metal-transition metal chalcogenide secondary cell or battery providing long cycle-life at high energy densities and having a high coulombic efficiency under conditions of repeated cycling.

2. Prior Art

High energy density batteries are of particular interest for application as a source of power for an electric vehicle and for load leveling in the electric utility industry. Initially, the interest was directed toward the lithium-sulfur cell using a molten halide; see M. L. Kyle et al., "Lithium/Sulfur Batteries for Electric Vehicle Propulsion", 1971 Sixth Intersociety Energy Conversion Engineering Conference Proceedings, p. 38; L. A. Heredy et al., Proc. Intern. Electric Vehicle Council 1, 375 (1969). Such lithium-molten salt batteries using sulfur positive electrodes when fully developed could provide an energy density of greater than 100 watt-hr/lb. Were a cycle life of 2500 cycles and an operating life of 10 years attainable with these batteries, they could satisfy all the requirements of electric power peaking, which is of great interest to the electric utility industry for providing off-peak energy storage and load leveling.

It has been found, however, that long cycle life is difficult to attain with such high-temperature molten salt batteries containing a sulfur electrode because of the gradual loss of the active sulfur material from the positive electrode compartment at these elevated temperatures. Sulfur loss generally occurs by vaporization of the sulfur or by dissolution of intermediate discharge products (polysulfide ions) in the molten salt electrolyte followed by diffusion from the positive electrode compartment through the bulk of the electrolyte to the negative lithium electrode.

To eliminate some of these problems, it has been proposed (U.S. Pat. No. 3,898,096 issued Aug. 5, 1975) to use certain selected transition metal chalcogenides as the positive electrode material in lieu of elemental sulfur. The preferred positive electrode materials are copper sulfide, iron sulfide, nickel sulfide, and nickel oxide. The patent teaches that the positive electrode materials, which are in solid form at the operating temperature of the molten salt electrolyte battery, must be made readily available in a finely divided form presenting a high specific surface.

Several methods are suggested for presenting such a high specific surface of the positive electrode material. In accordance with one suggested method, a lattice of porous graphite is used, and the lattice is impregnated with the positive electrode material using a slurry of such material in a volatile liquid. The porous graphite lattice then is baked to evaporate the volatile liquid, leaving the positive electrode material in the form of fine particles distributed throughout the interstices of the porous graphite lattice. The other suggested methods are substantially the same as those utilized in the prior art for cathodes which employed elemental sulfur as the positive electrode material.

It has been discovered, however, that certain problems are encountered when a transition metal chalcogenide is used as the positive electrode material, which problems are not present when such material is elemental sulfur. More particularly, during discharge of a battery which utilizes iron sulfide as the active cathode material, the iron sulfide reacts with lithium to form elemental iron and lithium sulfide. The iron and lithium sulfide so formed occupy a volume approximately twice that of the original iron sulfide. Thus, sufficient void space must be left in the matrix to allow for such expansion in volume. The iron sulfide, iron, and lithium sulfide are solid at the operating temperatures of the battery. Therefore, unlike sulfur, which is liquid at the operating temperature of the battery and can move throughout the substrate to evenly distribute the loading, the use of a metal sulfide can result in high localized loading of the substrate. Such high localized loading can result in a physical breakdown of the substrate structure.

More recently, it has been suggested in U.S. Pat. No. 3,925,098 that the transition metal chalcogenide be loaded into a porous pliable felt matrix formed from resilient carbon fibers or filaments retained in a rigid structure. Such method overcomes the prior art problems of high localized stresses and the prior art rigid substrates. However, the utilizable ampere-hour capacity per cubic centimeter of electrode prepared in such a manner is still low, generally in the order of about 0.6 ah/cc using $FeS_{1.5}$ (an equimolar mixture of FeS and $FeS_2$), for example. Obviously, there is still a need for an improved positive electrode utilizing such transition metal chalcogenides as the active material.

Two approaches generally have been followed in the construction of a negative lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

It has been suggested that metals structurally resistant to attack by molten lithium may be wetted by immersion in molten lithium maintained at a high temperature. However, the structure so wetted by lithium at these higher temperatures usually undergoes progressive de-wetting when used as the negative electrode in a secondary battery containing a molten salt electrolyte maintained at the substantially lower temperatures at which such a battery operates. Thus, after operation of the battery for a number of cycles, it has been found that lithium no longer preferentially wets the substrate, the electrode progressively losing capacity. Various methods have been proposed in an attempt to overcome this problem. See, for example, U.S. Pat. Nos.

3,409,465 and 3,634,144. None of the proposed methods have proven entirely satisfactory.

The use of a solid lithium alloy as taught by the prior art also is not without problems. More particularly, lithium-aluminum alloy, for example, is approximately 300 millivolts more positive than liquid lithium. Thus, electrochemical cells utilizing lithium-aluminum alloys as electrodes are not able to achieve the same potentials as those utilizing liquid lithium electrodes. Further, in a molten salt electrolyte, the lithium-aluminum alloy electrode expands and contracts greatly during charging and discharging of the electrochemical cell. Still further, lithium-aluminum alloys generally are limited to a lithium content of less than about 30 wt.%.

Various other materials have been suggested for use as an alloy with lithium to form a solid electrode. In U.S. Pat. 3,506,490, for example, it is suggested that the lithium be alloyed with either aluminum, indium, tin, lead, silver or copper. However, none of these materials have been proven to be completely satisfactory. More particularly, these other suggested materials, such as tin and lead for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminium alloy; thus, alloys of such other materials are less desirable. Other patents relating to solid lithium anodes include U.S. Pat. Nos. 3,506,492 and 3,508,967.

More recently, in U.S. Ser. Number 605,691 filed Aug. 18, 1975, now U.S. Pat. No. 3,969,139, and assigned to the Assignee of the present invention, there has been suggested an improved lithium electrode and an electrical energy storage device such as a secondary battery or rechargeable electrochemical cell utilizing such electrode. The improved electrode comprises an alloy of lithium and silicon in intimate contact with a supporting current-collecting matrix. The lithium is present in the alloy in an amount from about 28 to 80 wt.%.

Various supporting current-collecting matrices are suggested. It is taught that the support and current-collecting capability may be provided by a single structure, or the support provided by one structure and current-collecting capability by another structure. The matrix for impregnation with lithium-silicon alloy is disclosed as a porous substrate having an apparent density from about 10 to 30% of that of the base material and a median pore size within the range of from about 25 to 100 microns. A particularly preferred form of such a substrate is formed from woven or non-woven wires pressed together to a desired apparent density and then sintered. It was noted by Patentee, that during some of the early tests, the supporting current-collecting matrix underwent a physical disintegration. At that time it was not known whether such deterioration was the result of a chemical reaction, or if it resulted from a physical expansion of the alloy. More recently, it has been determined that the alloy expands and contracts upon charge and discharge cycling. As in the case of the positive electrode, when the matrix is formed from a material having a sufficient size and strength to withstand the expansion forces of the alloy, the ampere-hour capacity per cubic centimeter is below that desired.

Thus, a need still exists for a lithium electrode structure which would retain its capacity upon continued cycling when used as a negative electrode in an electrochemical cell, which preferably would have a potential as close to liquid lithium as possible, and which would maintain its dimensional stability during charging and discharging of the cell.

SUMMARY OF THE INVENTION

In accordance with the present invention, there is provided an improved rechargeable electrical energy storage device which utilizes an improved electrode structure in contact with a molten salt electrolyte. Broadly, the improved electrode structure comprises a unitary multi-cell structure including a plurality of wall members having edges and axially extending surfaces which form a plurality of cells having at least one open end, said cells having a cross-sectional area of at least about 0.04 $cm^2$. The edges of the wall members in the open end of the cells are aligned in a common plane to form a planar face. The axially extending surfaces of the wall members are substantially perpendicular to the planar face. The structure further includes a body of electrochemically active material disposed in the cells, the material being solid at the operating temperature of the device. The body of electrochemically active material is retained in place by an electrolyte-permeable member which is affixed to the wall members and covers the open end of the cells. Generally the electrode structure of the present invention will have a planar face having a surface area of from about 25 to 300 $cm^2$.

The multi-cell structure of the present invention is essentially a macroporous or open-faced cellular structure. The individual cells may take various forms, however, such as squares, diamond shapes, rectangular, circular, octagonal, or indeed just about any geometric shape. Further, the individual cells may or may not share a common wall. The particularly preferred form is one in which the individual cells are hexagonal in shape, sharing a common wall to form a honeycomb structure. This preferred shape optimizes the void volume for retention of active material while at the same time providing a high strength to weight ratio. In some instances, however, other less complex forms such as square-shaped cells may be preferred for economic reasons.

It is an essential feature that the open cell cross-sectional area be at least about 0.04 $cm^2$. Further, the void volume of each cell must extend substantially perpendicular to the planar face of the multi-cell structure. Generally, the wall members of the structure will be formed to provide cells having a cross-sectional area of from about 0.04 to 2 $cm^2$ with a range of from about 0.04 to 0.2 $cm^2$ being preferred. An advantage of this structure over the prior art porous structures is the ease with which it can be uniformly loaded with active materials.

The cell depth of the multi-cell structure is not particularly critical. Generally, it has been found that good utilization of the active material is attainable with cells having a depth of from about 0.1 to 2.0 cm and preferably from about 0.5 to 1.0 cm. It will be appreciated, however, that the depth of the cell and thickness of the wall members of the multi-cell structure should be such as to provide structural integrity and resist warping. Particularly good results have been obtained with respect to effective utilization of active material and structural integrity when the ratio of the open cross-sectional area of the cell to the depth of the cell is maintained within a range of from about 1:1 to 2:1 and the wall members of the cell have a thickness within the range of from about 0.002 to 0.05 cm, preferably from about 0.002 to about 0.02 cm.

The particular material selected for the electrode structure of the present invention is not critical except insofar as it must be one which is not attacked or corroded by the molten electrolyte during normal operation of the device. Generally, iron, steel, nickel or nickel steel alloys are preferred on the basis of cost. However, if the active material is, for example, $FeS_2$, iron is not suitable, since it would react with the sulfur during the charge cycle. Thus, depending upon the choice of active material and electrolyte, the suitable materials may also include, for example, carbon, molybdenum, titanium, and various alloys thereof. Materials suitable for construction of the invention should be good electrical conductors which may be readily fabricated into the final shape by either welding or brazing.

The electrolyte-permeable member may be conductive or non-conductive and fills two functions: (1) to permit free passage of charged ions and electrolyte into and out of the cells, and (2) to retain the active material in the cell. It has been found that the structural integrity of the electrode structure is greatly enhanced when the electrolyte-permeable member is fixedly attached to the wall members, preferably at the edges of the wall members, for example, by welding, brazing, or diffusion bonding.

In a particularly preferred embodiment the electrolyte-permeable member is formed from a wire screen wherein the individual wires have a diameter of from about 0.002 to 0.02 cm, the openings in the electrolyte-permeable member should have a cross-sectional area within the range of from about $1 \times 10^{-6}$ to $1 \times 10^{-3}$ cm$^2$, and there should be provided from about $10^5$ to $10^2$ openings per square centimeter. The electrolyte-permeable member preferably is made from the same material as the wall members. In addition to screens, other forms which may be used are porous sintered plaques, perforate plates, and the like. While the wire screen is applicable to both positive and negative electrode structures because of its low cost, these other forms also may be used. When a porous plaque such as porous nickel, iron or the like is used, it should have an apparent density of from about 20 to 60% of that of the base metal and an average pore size of from about 1 to 20 microns.

As opposed to the prior art techniques, which utilize porous rigid structures or metal felts with or without additional structural support, the present invention provides an electrode structure having an apparent density of less than about 10% of the base material. Indeed, as will be seen in later examples and the description of the drawings, it is possible to provide a multi-cell electrode structure having far greater strength than the prior art structures and an apparent density as low as 6% or less. Further, the electrode structure of the present invention permits a far greater utilization of the theoretical capacity of the active material in the electrode than the prior art structures.

DESCRIPTION OF THE PREFERRED EMBODIMENTS

Figure 1:
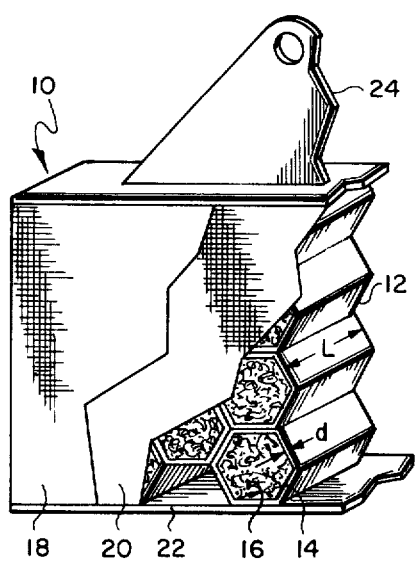
FIG. 1 is a partially broken away perspective view of a multi-cell electrode structure formed in accordance with the present invention.

The present invention is particularly applicable to the so-called high energy density batteries. It will be specifically described with respect to those batteries which utilize an alkali metal alloy as the electronegative active material in contact with a molten salt electrolyte, i.e., one which is molten at the operating temperature of the battery. The electronegative active material may be an alloy of any alkali metal, such as lithium, sodium, potassium or rubidium. However, for convenience, the following description will be directed to the particularly preferred alkali metal, namely, lithium. Further, it will be appreciated that the alkali metal may be alloyed with any other metal, provided that the alloy is a solid at the operating temperature of the electrical energy storage device. The selection of the alloy, or alloy constituent, will of course have a significant bearing upon the voltage potential with respect to any given positive electrode material, and further, will have an equally significant effect upon the amount of active material which may be present in the alloy. For example, lithium may be alloyed with either aluminum, indium, tin, lead, silver, or copper. However, the particularly preferred alkali metal alloy is a mixture of lithium and silicon in which the lithium is present in an amount of about 55% when the electrode is in its fully charged state.

The term "selected transition metal chalcogenides" as herein defined refers to the chalcogenides of those transition elements of the first series of the Periodic Table beginning with vanadium (atomic number 23) and concluding with zinc (atomic number 30), and further including molybdenum (atomic number 42) from the second series of transition elements. While scandium and titanium are ordinarily classified as transition elements based on their atomic structure; they show a general lack of resemblance in their chemical behavior to the other transition elements. Thus, scandium and titanium chalcogenides are considered essentially minimal in effectiveness for the purpose of the present invention. Because of the close similarity in behavior between chromium and molybdenum, the chalcogenides of the latter element are considered usable for the present invention. Thus, the chalcogenides of the first series of transition metals beginning with vanadium and concluding with zinc, with the further addition of molybdenum, are defined herein as those chalcogenides of specific interest and utility in the practice of the present invention. The preferred transition metal chalcogenides in the practice of the present invention are the chalcogenides of copper, iron, and nickel. Particularly preferred positive electrode materials include copper sulfide, iron sulfide, nickel sulfide, and nickel oxide.

It will, of course, be realized that mixtures or alloys of the desired transition metals or mixtures of their chalcogenides could also be used for preparation of the desired transition metal chalcogenides. For example, a nickel-chromium alloy or a mixture of copper and iron could be converted to the corresponding sulfides, or such metal sulfides prepared by other means could then be mixed and utilized as the positive electrode material.

Also, as is well recognized, the terms "oxide" and "sulfide" are frequently used in a generic sense. For example, five crystallographically defined compounds of nickel sulfide exist. Also, double salts such as those of molybdenum and chromium are also suitable in the form of their alkali metal compounds, e.g., $K_2Cr_2O_7$, $Li_2MoO_4$, $Na_2Mo_4$, $Li_2CrO_4$, $K_2MoS_4$. While not all forms of oxides and sulfides of the same transition metal element will behave in the same manner and be equally preferred, the most suitable form may be readily selected, particularly with reference to obtainable cycle life and theoretical energy density of the lithium-molten salt cell in which this compound is used as the positive electrode.

Because of the need for a rechargeable power-producing secondary cell having a high current density and a low internal resistance, the chalcogenides, which are solid at the temperature of operation of the molten salt cell, most be made readily available in a finely divided form presenting a high specific surface.

Generally, the chalcogenides will have an initial median particle size of from about 20 to 150 microns and preferably a median particle size of 37 to 63 microns.

Obviously, the finely divided chalcogenides or alkali metal alloy must be confined within some specific volume and advantageously will be substantially uniformly distributed throughout such specific volume provided. The products resulting from discharge of an electrical energy storage device utilizing a chalcogenide as the active positive electrode material will occupy approximately twice as much space as the original chalcogenide. In the negative electrode the alkali metal alloy decreases in volume during discharge. However, it does appear to undergo a change in crystal structure during repeated cycling. The change in structure results in a significant increase in volume. Thus, after several cycles, the alloy will occupy about twice the volume it did in its initial state. Therefore, the volume of space provided for the selected electrochemically active material must be sufficiently large to allow for such expansion. Also, about 10 to 60% of the free volume must be allotted for molten salt electrolyte to provide for satisfactory ionic conduction inside the electrode.

The term "molten salt electrolyte" as used herein is exemplified by a lithium halide-containing salt which is maintained at a temperature above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide, and mixtures thereof. Two preferred binary salt eutectic mixtures are those of lithium chloride and potassium chloride (melting point 352° C), and lithium bromide and rubidium bromide (melting point 278° C).

Examples of ternary eutectics useful as the molten salt electrolyte include calcium chloride-lithium chloride-potassium chloride, lithium chloride-potassium chloride-barium chloride, calcium chloride-lithium chloride-barium chloride, and lithium bromide-barium bromide-lithium chloride. Preferred ternary eutectic mixtures include those containing lithium-chloride, lithium fluoride and lithium iodide (melting point 341° C) and lithium chloride, lithium iodide and potassium iodide (melting point 260° C).

The suitable alkali or alkaline earth metal ion should have a deposition potential very close to or preferably exceeding deposition potentials of lithium ion in the electrolyte. Lithium halide salts can be readily combined with halides of potassium, barium, and strontium. Halides of metals such as magnesium, cesium, rubidium, calcium, or sodium may be used, but a substantial proportion of these metals may be co-deposited with the lithium when the electrode is charged, with a resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large scale applications such as electric powered vehicles and electric utility bulk energy storage.

Preferably, a lithium chalcogenide corresponding to the chalcogenide of the positive electrode is added to the molten salt. Thus, where the positive electrode material is a sulfide or oxide, $Li_2S$ or $Li_2O$ is added, respectively, to the molten salt. It has been found that if a saturating amount of the lithium sulfide (about 0.1 wt.%) or lithium oxide (about 0.4 wt.%) is added to the fusible salt electrolyte, long-term cell performance is enhanced. The basic chemistry of the reactions occurring in alkali metal halide molten salt systems has been investigated extensively, but is still only imperfectly understood because of its complexity. See, for example, "Behavior of Metal Oxides and Sulfides in Molten LiCl—KCl Eutectic. Chemical Reactions Forming $O^=$ and $S^=$ Ions." Delarne, *Chim. Anal.* (Paris) 44, 91–101 (1962). C.A. 57, 7982b (1962).

Referring now to FIG. 1, therein is depicted a unitary multi-cell electrode structure 10, constructed in accordance with the present invention. The structure comprises a plurality of stainless steel wall members 12, having axially extending surfaces and edges 14, which form the plurality of cells which are open on each end. The thickness of the wall member $d$, and the depth or length of the cell L, are selected such as to provide the desired strength and rigidity. For a multi-cell electrode structure having an overall surface area of from about 50 to 1000 cm², a wall thickness $d$ of from about 0.002 to 0.02 cm and a length L of from 0.5 to 2 cm, has been found to be satisfactory for cells having a cross-sectional area of from about 0.04 to 0.2 cm². It is a feature of the present invention that the cross-sectional area of the cells is substantially uniform through their length L and that the axis of each cell is substantially perpendicular to the planar face formed by the edges 74. The edges 14 of the wall members form a substantially planar face which is covered by one or more conductive or non-conductive electrolyte-permeable members. Preferably, in the embodiment shown, a body of active material 16 is retained in place by two superimposed stainless steel screens 18 and 20. One of the screens, either 18 or 20, is selected to have a sufficient number and size of openings to retain the active material within the multi-cell electrode structure. The other screen is selected to have a wire size sufficient to provide the desired additional structural strength. The screens are affixed to one another and to the wall members by welding at a plurality of points, by diffusion bonding or brazing the screens to substantially the entire surface of the exposed edges 14. In the embodiment shown, the electrode structure also includes an optional housing 22, which circumscribes the periphery of the wall members and is fixedly attached thereto preferably in the same manner as the screen members. In a particularly preferred embodiment the screen member also is attached to the housing. The electrode structure also includes a bracket means 24 (also affixed to the electrode structure) for supporting the electrode structure and further providing a current-collecting and conducting means for the passage of electric current therethrough. Generally, only one electrolyte-permeable member is used rather than the two depicted in FIG. 1. When only one is used, it should have the wire size, number of openings per square centimeter, and size of openings hereinbefore described.

Figures 2A, 2B:
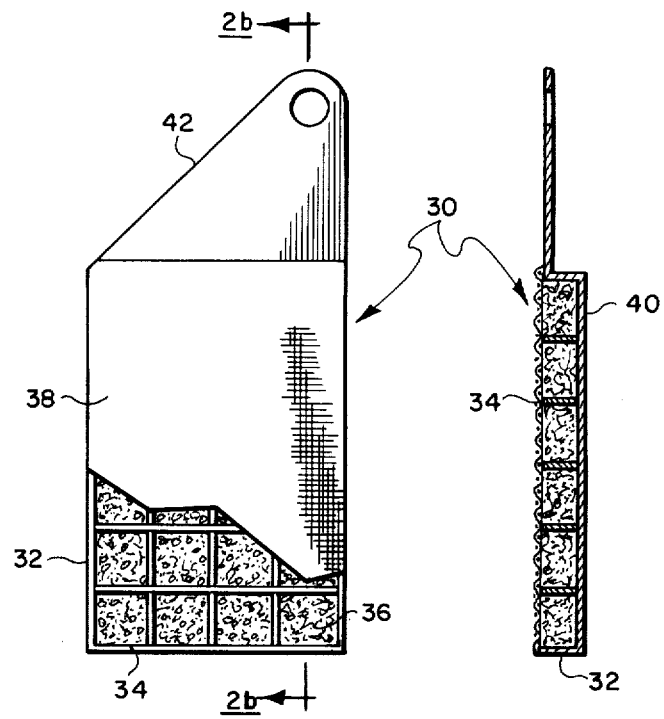
FIG. 2a is a partially broken away front elevation view of another embodiment of the multi-cell electrode structure of the present invention.
FIG. 2b is a sectional view of 2a taken along the line 2b—2b.

Referring to FIGS. 2a and 2b, therein is depicted another embodiment of the multi-cell electrode structure 30 of the present invention. In the embodiment depicted, the cells have a single open faced end, are rectangular in shape, and are formed by a plurality of wall members 32, having edges 34, which edges form a substantially parallel plane. In the embodiment depicted, the cells share a common wall with an adjacent cell and contain a body of active material 36. The planar face defined by wall members 32 is covered by a stainless steel wire screen 38 having a mesh size of 26 × 500, the opposite side being closed by an impervious conductive cover member 40. A bracket means 42 is provided for support and current collection.

Figures 3A, 3B:
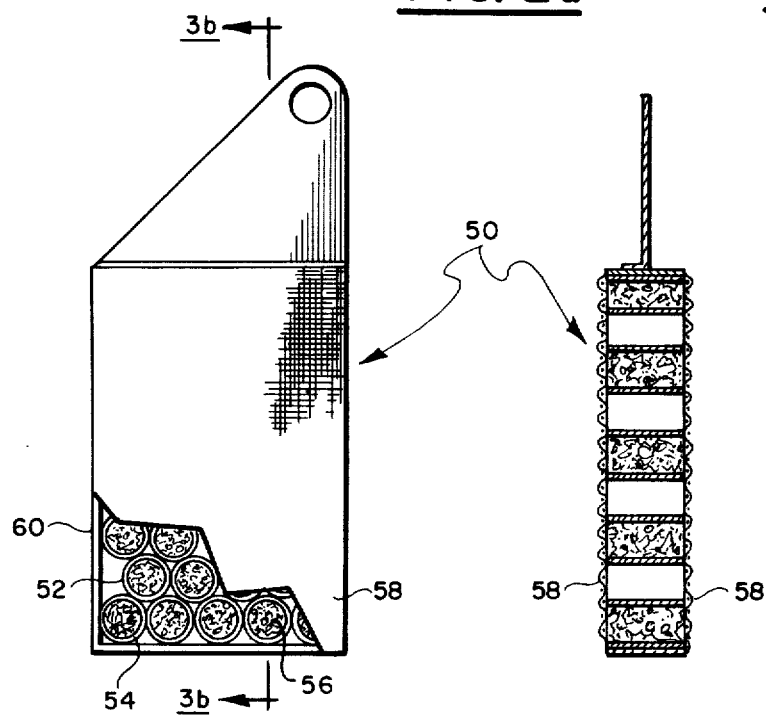
FIG. 3a is the partially broken away front elevation view of still another embodiment of the multi-cell electrode structure of the present invention.
FIG. 3b is a sectional view of that structure taken along the line 3b—3b.

FIGS. 3a and 3b depict yet another embodiment of the present invention. Specifically, the multi-cell electrode structure 50, open faced at both ends, comprises a plurality of wall members 52, which are in the form of substantially right circular cylinders having edges 54 which form the planar face. In this embodiment the cells do not share common wall members. However, each individual cylinder is bonded to at least one adjacent cylinder or the electrolyte-permeable member to provide a unitary structure The plurality of cells is circumferentially surrounded by a housing 60. Affixed to edges 54 and housing 60 is an electrolyte-permeable member 58. It will be noted that in FIGS. 1 and 3 the multi-cell electrode structure is open-faced on both sides as opposed to FIG. 2. Hence each side must be provided with an electrolyte-permeable member 58. A body of active material 56 is retained in the cells by electrolyte-permeable member 58.

Figure 4:
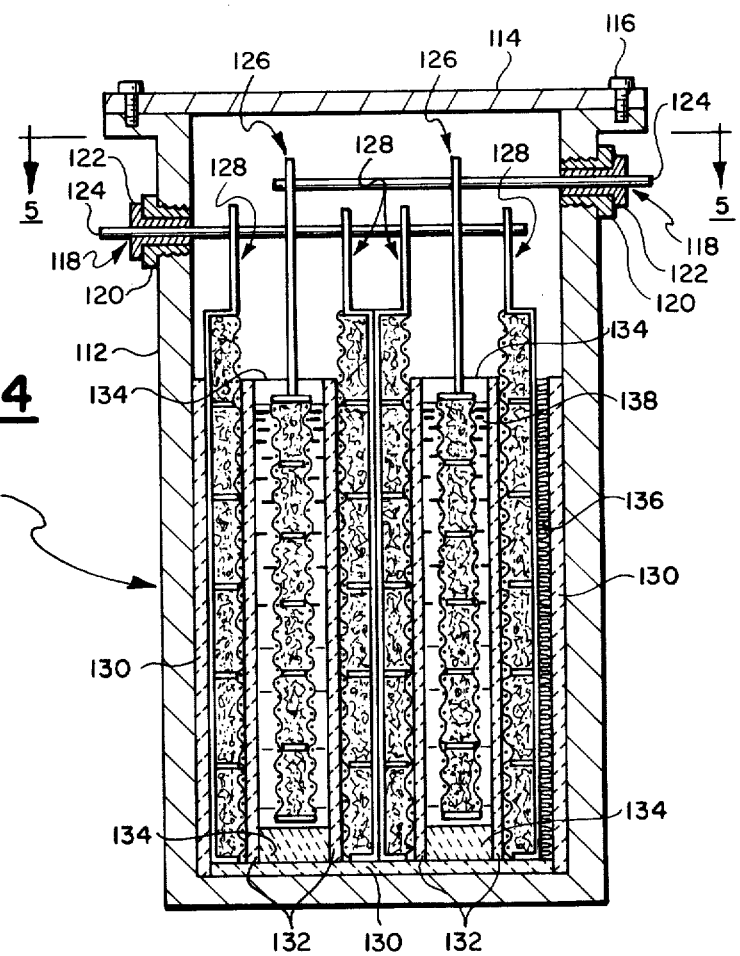
FIG. 4 is a front elevation view in cross section of an electrical energy storage device including the multi-cell electrode structures of the present invention.
Figure 5:
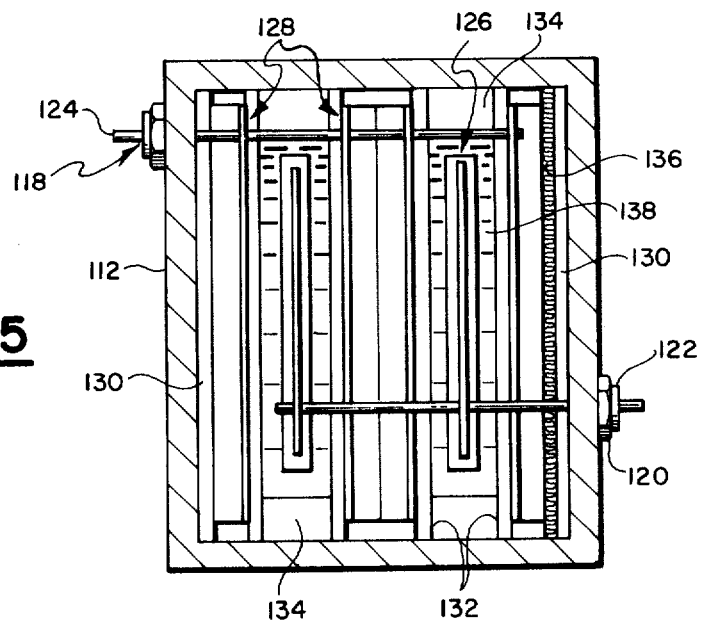
FIG. 5 is a sectional view of FIG. 4 taken along the line 5—5.

Referring now to FIGS. 4 and 5, therein is depicted an electrical energy storage device 110, which includes a plurality of electrodes constructed in accordance with the present invention. The device comprises a steel housing 112, which is provided with a conductive cover 114. The cover preferably is in sealing engagement with the housing, which may be accomplished utilizing known techniques such as providing polished mating surfaces, seals, gaskets or the like. Cover 114 is secured to housing 112 by a plurality of threaded fasteners 116.

The device is provided with positive and negative electrode conductor means 118, each of which includes a body member 120 and electrical insulator member 122 and a steel current-conducting supporting rod 124, which projects into the interior of housing 112. Suspended from one current-conducting and supporting rod 124 are two negative electrode assemblies 126, which are substantially the same as those depicted in FIG. 1, and suspended from the other current-conducting supporting rod 124 are four single-faced positive electrode assemblies 128, which are substantially the same as those depicted in FIG. 2, except that the cells are hexagonal in shape. The device includes a plurality of ceramic insulator members 130 to provide electrical insulation between the steel housing and the device components. Each positive electrode assembly 128 is provided with a porous ceramic separator member 132. The separator members 132 and positive electrode assemblies 128 are maintained in a spaced-apart relationship by spacer members 134 and a spring member 136. Advantageously, spring member 136 comprises a partially compressed body of carbon or graphite fiber. The space between the several electrode structures 128 is filled with a suitable fused salt electrolyte 138, which is molten at the operating temperature of the device. The device when in operation is heated by any suitable means, not shown. For example, a plurality of such electrical energy storage devices may be contained in an electric furnace or surrounded by resistance heating elements. As will be seen in a later example, the volume and weight of such a device may be substantially reduced by grounding one electrode to the case and eliminating the spacers and insulators.

The following examples are set forth for the purpose of further illustrating the present invention. For convenience, most of the examples relate to use of the multi-cell electrode structure of the present invention as a negative electrode, which is preferred, in a molten salt electrolyte. However, the invention should not be construed as being limited to a negative electrode in an electrical energy storage device utilizing a molten salt electrolyte, for, as herein disclosed, it will have equal utility as the electropositive electrode.

EXAMPLE 1

The following tests demonstrate the superiority of an electrode formed in accordance with the present invention over those of the prior art. A piece of metal felt was obtained and cut to a size of 5 cm × 5 cm × 0.64 cm. The metal felt was formed from 430 stainless steel, had a median pore size of about 0.2 mm and an apparent density of about 20%. This electrode was impregnated with a lithium-silicon alloy containing 70 wt.% of lithium. The lithium was stripped electrochemically to provide an electrode containing a lithium-silicon alloy containing 55 wt.% of lithium and having a theoretical capacity of 1.2 ampere-hour /cm$^3$ of electrode void volume. This electrode was placed in an open cell containing a molten potassium chloride-lithium chloride electrolyte and alternately discharged and charged at a current density of 40 ma/cm$^2$ against a metal sulfide-containing cathode structure. The charge-discharge curve showed little symmetry (indicating poor reversibility), and the characteristic voltage plateaus for lithium-silicon were poorly defined in the charge mode. A recovered capacity of about 60% of the theoretical value was all that was attained.

Another similar electrode substantially the same overall size was formed except in accordance with the present invention. Specifically, the structure comprised a honeycomb configuration of cells similar to that depicted in FIG. 1. This electrode also was filled with a lithium-silicon alloy containing 70 wt.% of lithium and then stripped electrochemically to provide an electrode containing 55 wt.% lithium to provide a theoretical capacity substantially the same as the aforementioned prior art electrode. This electrode then was tested in substantially the same manner as the prior electrode. The charge-discharge curve obtained with this electrode is much more symmetrical, indicating that the electrode is highly reversible. A capacity corresponding to 80% of the theoretical value was reached when the electrode was cycled at the same current density (40 ma/cm$^2$) as the prior art anode. This electrode was cycled more than 300 times over a period of time in excess of 5000 hours with no significant loss in coulombic efficiency, utilization or structural integrity being observed.

A similar test was performed using an anode substantially as depicted in FIG. 1, which had a thickness L of only about 0.26 cm. When this electrode was cycled, at a current density of 35 ma/cm$^2$, 91% utilization of the active material was attained, thus providing an electrode with a usable specific capacity of 1.06 ampere-hour/cm$^3$.

When the foregoing comparison test is repeated using a transition metal chalcogenide, a higher loading of active material and hence a higher usable specific capacity (ampere-hour/cm$^3$) is obtainable with the electrode of the present invention.

EXAMPLE 2

The following example is set forth to demonstrate the utility of the electrical energy storage device of the present invention containing a multi-cell electrode structure in contact with a molten electrolyte. The device is similar to that depicted in FIGS. 4 and 5, except that it is a single cell device containing one negative electrode suspended between two positive electrodes. The insulator and spacer members are removed and the positive electrodes are grounded to the case, thus eliminating the need for one exterior electrical connector. The electrode structures are similar to those depicted in FIG. 1, with the two positive electrodes being single-faced and the central negative electrode being a double-faced structure. Each electrode is approximately 11.4 × 11.4 cm square, the positive electrodes being 0.472 cm thick and the negative electrodes approximately 0.944 cm thick.

The active materials used in the positive electrode is FeS, and the active material in the negative electrode is a lithium-silicon mixture comprising about 55 wt.% lithium, the amount of each being sufficient to provide a theroretical capacity of about 120 watt-hours. Silicon-nitride insulating separators are interposed between the positive and negative electrodes. The electrodes and separators were impregnated with a eutectic mixture of a lithium and potassium chloride electrolyte. The device components and housing were sized such that the electrode and spacer fit snugly within the housing such that the need for a spring also was eliminated. A device having similar capacity utilizing the prior art electrode structures would have weighed almost twice as much to attain the same structural integrity as that built utilizing the present invention. The present device was cycled for 15 charge-discharge cycles over a period of 400 hours with no deterioration in performance or structural integrity observed, thus further demonstrating the utility of the present invention.

It will, of course, be realized that various modifications can be made in the design and operation of the multi-cell electrode structure and energy storage device of the present invention without departing from the spirit thereof. Thus, while the electrode structure has been illustrated and described with respect to certain exemplary embodiments relating to particular preferred constructions and materials, and while preferred embodiments of secondary cells utilizing molten salt electrolytes and metal sulfide cathodes have been illustrated and described, it should be understood that within the scope of the appended claims the invention may be practiced otherwise than as specifically illustrated and described.

What is claimed is:

1. In a rechargeable electrical energy storage device containing an electrolyte molten at the operating temperature of the device and electropositive and electronegative electrode structures spaced apart in said electrolyte, the improvement wherein at least one of said electrode structures comprises a unitary multi-cell structure including:
   a plurality of wall members having edges and axially extending surfaces which form a plurality of cells having at least one open end and a cell cross-sectional open area of at least about 0.04 cm$^2$, said edges of said wall members and the open end of said cells being aligned in a common plane to form a planar face, the axially extending surfaces of said wall members being substantially perpendicular to said planar face;
   a body of electrochemically active material disposed in said cells, said material being a solid at the operating temperature of said device; and
   an electrolyte-permeable member affixed to said wall members and covering the open end of said cells for retaining said active material in said cells.

2. The electrical energy storage device of claim 1 wherein said multi-cell structure is an electropositive electrode and said electrochemically active material is a transition metal chalcogenide.

3. The electrical energy storage device of claim 1 wherein said multi-cell structure is an electronegative electrode and said electrochemically active material is an alkali metal alloy.

4. The electrical energy storage device of claim 3, wherein the alkali metal alloy is a lithium-silicon alloy.

5. The electrical energy storage device of claim 1, wherein said electrolyte-permeable member is a steel screen.

6. The electrical energy storage device of claim 5, wherein said steel screen is bonded to said edges of said wall members.

7. The electrical energy storage device of claim 1, wherein said wall members form a plurality of hexagonal cells.

8. The device of claim 1 wherein both said electrode structures comprise:
   a unitary multi-cell structure;
   said multi-cell structures having an open cross-sectional area of from about 0.04 to 0.2 cm; and
   said electrolyte-permeable member being a porous member having a pore size within the range of about $10^{-3}$ to $10^{-6}$ cm$^2$.

9. The device of claim 8 wherein the electrochemically active material in the electropositive electrode structures is a transition metal chalcogenide, and the electrochemically active material in the other of said electrode structures is an alkali metal alloy.

10. The electrical energy storage device of claim 9 wherein the alkali metal alloy is a lithium-silicon alloy.

11. The device of claim 10 wherein said wall members form a plurality of hexagonal cells, and said electrolyte-permeable member is a metal screen bonded to the edges of said wall members.

* * * * *